United States Patent
Chi et al.

(10) Patent No.: US 8,115,771 B2
(45) Date of Patent: Feb. 14, 2012

(54) SYSTEM AND METHOD FOR MULTILEVEL SIMULATION OF ANIMATION CLOTH AND COMPUTER-READABLE RECORDING MEDIUM THEREOF

(75) Inventors: Chia-Ying Chi, Taipei (TW); Chi Chu, Hsinchu County (TW); Zen-Chung Shih, Hsinchu (TW); Wei-Te Lin, Taichung (TW)

(73) Assignee: Institute for Information Industry, Taipei (TW)

( * ) Notice: Subject to any disclaimer, the term of this patent is extended or adjusted under 35 U.S.C. 154(b) by 1082 days.

(21) Appl. No.: 11/965,684

(22) Filed: Dec. 27, 2007

(65) Prior Publication Data

US 2009/0141030 A1 Jun. 4, 2009

(30) Foreign Application Priority Data

Dec. 4, 2007 (TW) ................................ 96146123 A

(51) Int. Cl.
*G06T 13/00* (2011.01)
(52) U.S. Cl. ......... 345/473; 345/442; 345/474; 345/475
(58) Field of Classification Search .................. 345/423, 345/474
See application file for complete search history.

(56) References Cited

U.S. PATENT DOCUMENTS

| | | | | |
|---|---|---|---|---|
| 7,791,606 B2* | 9/2010 | Hadap | ............................ | 345/473 |
| 7,852,338 B1* | 12/2010 | Baraff | ............................ | 345/474 |
| 2005/0052461 A1* | 3/2005 | Vassilev et al. | ............... | 345/473 |
| 2005/0168465 A1* | 8/2005 | Tatsumi | ......................... | 345/423 |
| 2006/0133664 A1* | 6/2006 | Hong et al. | .................... | 382/154 |
| 2006/0235659 A1* | 10/2006 | Stam | .................................. | 703/2 |
| 2007/0085851 A1* | 4/2007 | Muller et al. | ................. | 345/474 |
| 2007/0091178 A1* | 4/2007 | Cotter et al. | .................. | 348/159 |
| 2007/0182744 A1* | 8/2007 | Styles | ........................... | 345/473 |
| 2007/0247465 A1* | 10/2007 | Hadap | ........................... | 345/473 |
| 2009/0002376 A1* | 1/2009 | Xu et al. | ....................... | 345/473 |

OTHER PUBLICATIONS

Yi-Chun Chu, Ian H. Witten, Richard Lobb, David Bainbridge, "How to Turn the Page," jcdl, pp. 186, Third ACM/IEEE-CS Joint Conference on Digital Libraries (JCDL'03), 2003.*
Thomas Jakobsen, "Advanced Character Physics", Gamasutra Features, 2003.*

(Continued)

*Primary Examiner* — Xiao M. Wu
*Assistant Examiner* — Phi Hoang
(74) *Attorney, Agent, or Firm* — Jianq Chyun IP Office

(57) ABSTRACT

A system for multilevel simulation of an animation cloth is provided. The system includes a multilevel area generation module, a curvature calculation module, a curvature comparison module, and a dynamic simulation module. The multilevel area generation module divides a plurality of grid units of the animation cloth into a plurality of level sub-areas based on a multilevel technique, wherein each of the level sub-areas is generated by dividing an upper level sub-area. The curvature calculation module calculates the curvatures of the level sub-areas according to the plane vectors of the grid units in a frame. The curvature comparison module compares the curvatures of the level sub-areas with a flatness threshold. The dynamic simulation module calculates the plane vector of each grid unit in a next frame through different method according to the comparison result of the curvature comparison module.

21 Claims, 8 Drawing Sheets

OTHER PUBLICATIONS

David Baraff and Andrew Witkin. 1998. Large steps in cloth simulation. In Proceedings of the 25th annual conference on Computer graphics and interactive techniques (SIGGRAPH '98). ACM, New York, NY, USA, 43-54. DOI=10.1145/280814.280821 http://doi.acm.org/10.1145/280814.280821.*

Robert Bridson, Ronald Fedkiw, and John Anderson. 2005. Robust treatment of collisions, contact and friction for cloth animation. In ACM SIGGRAPH 2005 Courses (SIGGRAPH '05), John Fujii (Ed.). ACM, New York, NY, USA, Article 2 . DOI=10.1145/1198555.1198572 http://doi.acm.org/10.1145/1198555.1198572.*

Article title "Using Wavelet Transform to Speedup Real-Time Cloth Simulation" authored by Chi et al., Computer Graphics Workshop 2007, Oct. 18, Session C1 Modeling I (15:45~17:25).

* cited by examiner

| A1 | A2 | B1 | B2 |
|---|---|---|---|
| A3 | A4 | B3 | B4 |
| C1 | C2 | D1 | D2 |
| C3 | C4 | D3 | D4 |

(b)

| A1+2 | B1+2 | A1−2 | B1−2 |
|---|---|---|---|
| A3+4 | B3+4 | A3−4 | B3−4 |
| C1+2 | D1+2 | C1−2 | D1−2 |
| C3+4 | D3+4 | C3−4 | D3−4 |

(c)

| A 1+2+3+4 | B 1+2+3+4 | A 1−2+3−4 | B 1−2+3−4 |
|---|---|---|---|
| C 1+2+3+4 | D 1+2+3+4 | C 1−2+3−4 | D 1−2+3−4 |
| A 1+2−3−4 | B 1+2−3−4 | A 1−2−3+4 | B 1−2−3+4 |
| C 1+2−3−4 | D 1+2−3−4 | C 1−2−3+4 | D 1−2−3+4 |

SYSTEM AND METHOD FOR MULTILEVEL SIMULATION OF ANIMATION CLOTH AND COMPUTER-READABLE RECORDING MEDIUM THEREOF

CROSS-REFERENCE TO RELATED APPLICATION

This application claims the priority benefit of Taiwan application serial no. 96146123, filed on Dec. 4, 2007. The entirety of the above-mentioned patent application is hereby incorporated by reference herein and made a part of this specification.

BACKGROUND OF THE INVENTION

1. Field of the Invention

The present invention generally relates to a system and a method for simulating an animation cloth and a recording medium thereof, in particular, to a system and a method for multilevel simulation of an animation cloth and a computer-readable recording medium thereof.

2. Description of Related Art

In a computer animation or a computer game, in order to render fine cloth dynamics or to process complicated impact detection between a piece of cloth and other objects, the piece of cloth is usually rendered with a grid model composed of mass-springs (as shown in FIG. 1) and simulated in real time through a physical simulation method.

The physical simulation method is to simulate real life physical phenomena in a computer program with mathematical calculations. Generally speaking, the physical simulation method is to calculate the total force (for example, including the gravity, an inertial force, and an external force etc) received by an object at a particular time point. For example, the mass point 1 in FIG. 1 receives bending forces from the mass point 2 and mass point 3, stretch forces from the mass point 4 and mass point 5, and a shear force from the mass point 6. After that, the acceleration produced by the total force is integrated into a velocity by using an integrator, and then the velocity of the object is integrated into a displacement, so that the movements of the object after it receives these forces can be obtained. The same movement of the object as in the real world can be simulated as long as the integrator is designed to conform to physical law.

However, a large quantity of calculations is to be done for simulating cloth animation in real time by using a simulation module established on the physical simulation method, and the calculation speed is very slow and instable. Thus, conventionally, in a multi-player or on-line game, cloth simulation is implemented based on a level-of-detail (LOD) model according to the availability of computer resources and the distance of the character or scene, so as to reduce the physical calculations. In other words, according to the existing LOD model, when a character is farther in the scene, the character is rendered with lower resolution so as to reduce the complexity of the model structure and the physical calculations by sacrificing fineness of the object.

FIG. 2(*a*) illustrates a piece of cloth rendered with different resolutions, wherein the resolutions of the cloth decrease from left to right. According to foregoing LOD model, the farther the scene is focused, the lower resolution in which the frame is rendered, and the closer the scene is focused, the higher resolution in which the frame is rendered. By this means, the calculation of the physical simulation method is reduced. FIG. 2(*b*) illustrates a piece of cloth in four different grid resolutions rendered in the same physical state, and FIG. 2(*c*) illustrates the results at a different time point. As shown in FIGS. 2(*b*) and 2(*c*), the animation cloth rendered with high and low resolutions looks very different. Thus, the conventional technique which reduces the calculation by rendering the object with low resolution will reduce the fineness of the object in a frame. Accordingly, a method for simulating an animation cloth which can reduce the calculation of the physical simulation method without sacrificing the resolution of the animation cloth is needed to be provided.

SUMMARY OF THE INVENTION

Accordingly, the present invention is directed to a system for multilevel simulation of an animation cloth, wherein a calculation of a physical simulation method, and accordingly the calculation time required for simulating the animation cloth, is reduced without sacrificing the resolution of the animation cloth.

The present invention is directed to a method for multilevel simulation of an animation cloth, wherein the calculation of the physical simulation method, and accordingly the calculation time required for simulating the animation cloth, is reduced without sacrificing the resolution of the animation cloth.

The present invention provides a computer-readable recording medium for recording a program which executes a method for multilevel simulation of an animation cloth, wherein the calculation of the physical simulation method, and accordingly the calculation time required for simulating the animation cloth, is reduced without sacrificing the resolution of the animation cloth.

The present invention provides a system for multilevel simulation of an animation cloth. The system includes a multilevel area generation module, a curvature calculation module, a curvature comparison module, and a dynamic simulation module. The multilevel area generation module divides a plurality of grid units of the animation cloth into a plurality of level sub-areas based on a multilevel technique, wherein each of the level sub-areas is generated by dividing an upper level sub-area. The curvature calculation module is coupled to the multilevel area generation module and calculates the curvature of each level sub-area according to a plurality of first plane vectors of the grid units in a first frame. The curvature comparison module is coupled to the curvature calculation module and compares the curvatures of the level sub-areas with a flatness threshold. The dynamic simulation module is coupled to the curvature comparison module and calculates a second plane vector of each grid unit in a second frame through different methods according to the comparison result of the curvature comparison module.

According to an embodiment of the present invention, when the curvature comparison module determines that the curvatures of the level sub-areas are smaller than or equal to the flatness threshold, the dynamic simulation module calculates the second plane vector of each grid unit on the boundaries of the level sub-areas through a physical simulation method and calculates the second plane vector of each grid unit within the boundaries of the level sub-areas through an interpolation method, and the curvature comparison module stops comparing the curvatures of lower level sub-areas in the level sub-areas. When the curvature comparison module determines that the curvatures of the level sub-areas are greater than the flatness threshold and the level sub-areas are on the lowest level, the dynamic simulation module calculates the second plane vector of each grid unit within the level sub-areas through the physical simulation method.

According to an embodiment of the present invention, the grid units have a $2^N \times 2^N$ array structure, wherein N is a positive integer.

According to an embodiment of the present invention, the curvatures of the level sub-areas are calculated through a wavelet transform.

According to an embodiment of the present invention, the wavelet transform is a Harr wavelet transform.

According to an embodiment of the present invention, the first plane vectors and the second plane vectors of the grid units are normal vectors of the animation cloth in the grid units, and the curvature of each level sub-area is the difference of the normal vectors between the grid units in the level sub-area.

According to an embodiment of the present invention, the multilevel animation cloth simulation system further includes a graphic module coupled to the dynamic simulation module, wherein the graphic module renders the second frame according to the second plane vectors of the grid units.

According to an embodiment of the present invention, the interpolation method is nearest neighbor interpolation method, linear interpolation method, or Spline interpolation method.

The present invention provides a method for multilevel simulation of an animation cloth. The method includes: dividing a plurality of grid units of the animation cloth into a plurality of level sub-areas based on a multilevel technique, wherein each of the level sub-areas is generated by dividing an upper level sub-area; calculating the curvature of each level sub-area according to a plurality of first plane vectors of the grid units in a first frame; and comparing the curvatures of the level sub-areas with a flatness threshold in the order of the multiple levels, wherein when the curvatures of the level sub-areas are smaller than or equal to the flatness threshold, a second plane vector of each grid unit on the boundaries of the level sub-areas in a second frame is calculated through a physical simulation method and the second plane vector of each grid unit within the boundaries of the level sub-areas in the second frame is calculated through an interpolation method, and the comparison of the curvatures of lower level sub-areas in the level sub-areas is stopped; and when the curvatures of the level sub-areas are greater than the flatness threshold and the level sub-areas are on the lowest level, the second plane vector of each grid unit within the level sub-areas in the second frame is calculated through the physical simulation method.

According to an embodiment of the present invention, the grid units have a $2^N \times 2^N$ array structure, wherein N is a positive integer.

According to an embodiment of the present invention, the curvatures of the level sub-areas are calculated through a wavelet transform.

According to an embodiment of the present invention, the wavelet transform is a Harr wavelet transform.

According to an embodiment of the present invention, the first and second plane vectors of the grid units are normal vectors of the animation cloth in the grid units, and the curvature of each level sub-area is a difference of the normal vectors between the grid units in the level sub-area.

According to an embodiment of the present invention, the multilevel animation cloth simulation method further includes rendering the second frame according to the second plane vectors of the grid units.

According to an embodiment of the present invention, the interpolation method is nearest neighbor interpolation method, linear interpolation method, or Spline interpolation method.

The present invention provides a computer-readable recording medium for storing a computer program, wherein the computer program executes a method for multilevel simulation of an animation cloth. The method includes: dividing a plurality of grid units of the animation cloth into a plurality of level sub-areas based on a multilevel technique, wherein each of the level sub-areas is generated by dividing an upper level sub-area; calculating the curvatures of the level sub-areas according to a plurality of first plane vectors of the grid units in a first frame; and comparing the curvatures of the level sub-areas with a flatness threshold in the order of the multiple levels, wherein when the curvatures of the level sub-areas are smaller than or equal to the flatness threshold, the second plane vector of each grid unit on the boundaries of the level sub-areas in a second frame is calculated through a physical simulation method, and the second plane vector of each grid unit within the boundaries of the level sub-areas in the second frame is calculated through an interpolation method, and the comparison of the curvatures of lower level sub-areas in the level sub-area is stopped, and when the curvatures of the level sub-areas are greater than the flatness threshold and the level sub-areas are on the lowest level, the second plane vector of each grid unit within the level sub-areas in the second frame is calculated through the physical simulation method.

According to an embodiment of the present invention, the grid units have a $2^N \times 2^N$ array structure, wherein N is a positive integer.

According to an embodiment of the present invention, the curvatures of the level sub-areas are calculated through a wavelet transform.

According to an embodiment of the present invention, the wavelet transform is a Harr wavelet transform.

According to an embodiment of the present invention, the first and second plane vectors of the grid units are normal vectors of the animation cloth in the grid units, and the curvature of each level sub-area is a difference of the normal vectors between the grid units in the level sub-area.

According to an embodiment of the present invention, the multilevel animation cloth simulation method further includes rendering the second frame according to the second plane vectors of the grid units.

According to an embodiment of the present invention, the interpolation method is nearest neighbor interpolation method, linear interpolation method, or Spline interpolation method.

The present invention provides a method for multilevel simulation of an animation cloth. The method includes: dividing a plurality of grid units of the animation cloth into a plurality of level sub-areas based on a multilevel technique, wherein each of the level sub-areas is generated by dividing an upper level sub-area; calculating the curvatures of the level sub-areas according to a plurality of first plane vectors of the grid units in a first frame; comparing the curvatures of the level sub-areas with a flatness threshold in the order of the multiple levels; and calculating a second plane vector of each grid unit in the level sub-areas in a second frame through different methods according to the comparison result.

The present invention provides a computer-readable recording medium for storing a computer program, wherein the computer program executes a method for multilevel simulation of an animation cloth. The method includes: dividing a plurality of grid units of the animation cloth into a plurality of level sub-areas based on a multilevel technique, wherein each of the level sub-areas is generated by dividing an upper level sub-area; calculating the curvatures of the level sub-areas according to a plurality of first plane vectors of the grid units in a first frame; comparing the curvatures of the level sub-areas with a flatness threshold in the order of the multiple levels; and calculating a second plane vector of each grid unit in the level sub-areas in a second frame through different methods according to the comparison result.

In the present invention, an animation cloth is divided into a plurality of sub-areas based on a multilevel tree structure, and the flatness of the animation cloth is determined according to the curvatures of the divided sub-areas so as to simulate each of the sub-areas through different methods. Thereby, the calculation of the physical simulation method, and accordingly the calculation time required for simulating the animation cloth, is reduced without sacrificing the resolution of the animation cloth.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7 is a diagram illustrating an example of a Harr wavelet transform.

DESCRIPTION OF THE EMBODIMENTS

Figure 1:
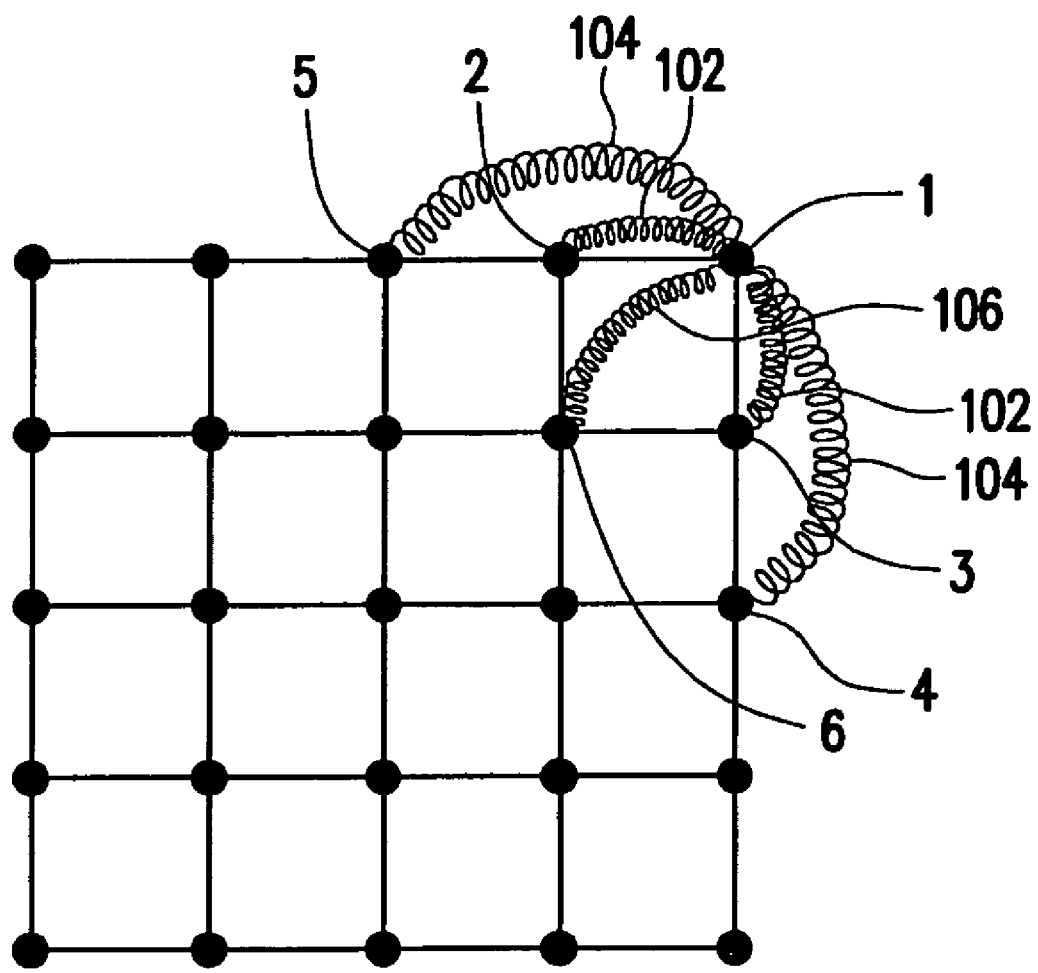
FIG. 1 is a diagram of a conventional grid model composed of mass-springs.
Figure 2:
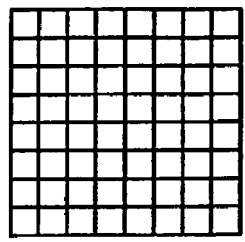
FIG. 2 is a diagram illustrating the fineness of an animation cloth with different resolutions according to a conventional technique.
Figure 2:
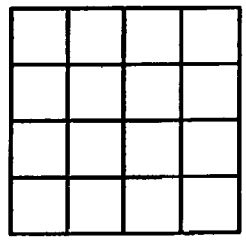
Figure 2:
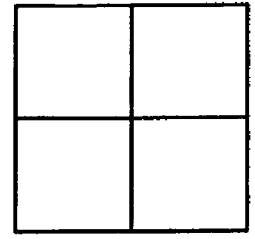
Figure 2:
Figure 2:
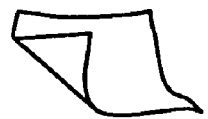
Figure 2:
Figure 2:
Figure 2:
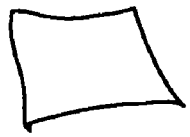
Figure 2:
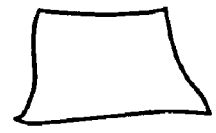
Figure 2:
Figure 2:
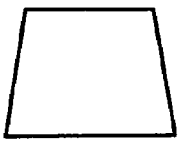

Reference will now be made in detail to the present preferred embodiments of the invention, examples of which are illustrated in the accompanying drawings. Wherever possible, the same reference numbers are used in the drawings and the description to refer to the same or like parts.

In the present invention, the grid units of an animation cloth is divided based on a multilevel technique, and the positions of the grid units in a next frame are calculated through different simulation methods according to the flatness of the divided sub-areas. Thereby, with limited computer resources, only those sub-areas requiring high resolution are simulated in high precision so that the physical calculations for simulating the animation cloth can be reduced.

Figure 3:
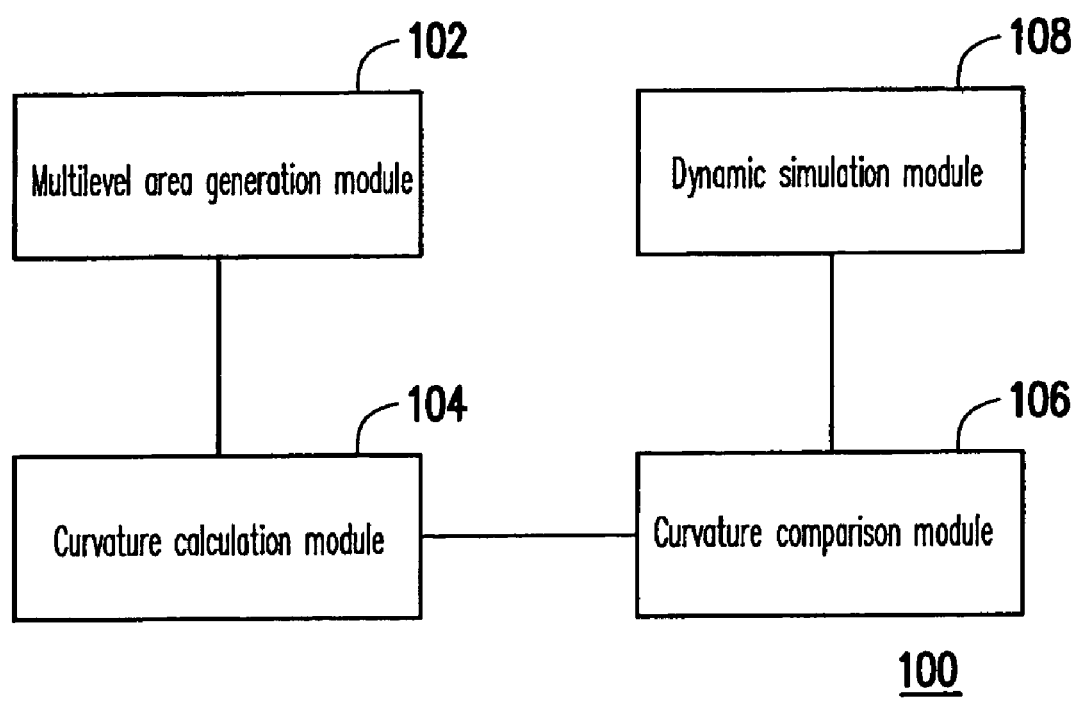
FIG. 3 illustrates a multilevel animation cloth simulation system according to an embodiment of the present invention.

FIG. 3 illustrates a multilevel animation cloth simulation system according to an embodiment of the present invention.

Referring to FIG. 3, the multilevel animation cloth simulation system 100 includes a multilevel area generation module 102, a curvature calculation module 104, a curvature comparison module 106, and a dynamic simulation module 108.

The multilevel area generation module 102 divides a plurality of grid units of the animation cloth into a plurality of level sub-areas based on a multilevel technique, wherein the lower level sub-areas are generated by dividing the upper level sub-areas. To be specific, the multilevel area generation module 102 divides the grid units of the animation cloth based on a multilevel tree structure. For example, in the present embodiment, the grid units of the animation cloth have a $2^N \times 2^N$ array structure, wherein N is a positive integer.

Figure 4:
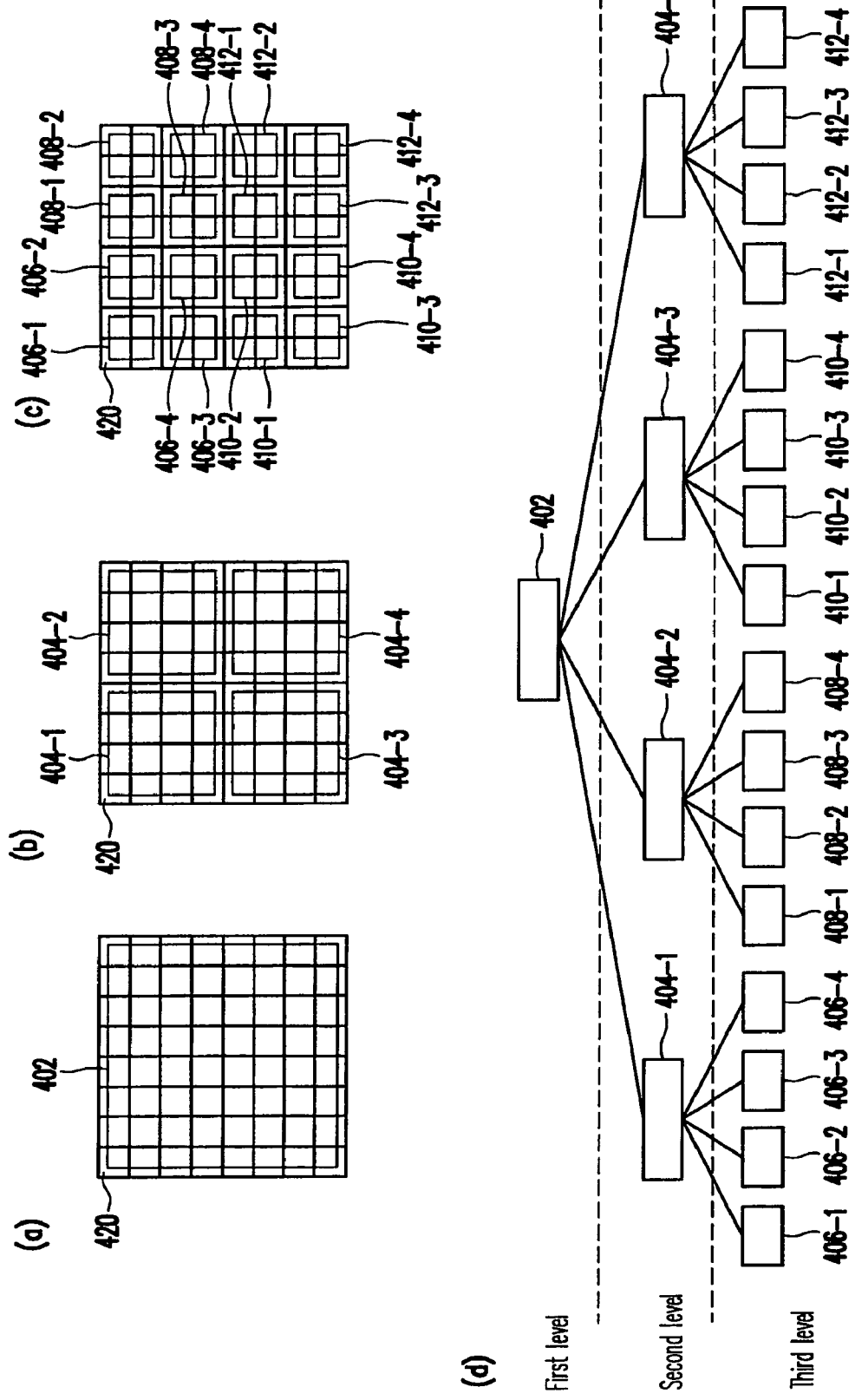
FIG. 4 is a diagram illustrating the division of an animation cloth having $2^3 \times 2^3$ grid units based on a 3-level tree structure.

Additionally, foregoing dividing the animation cloth based on a multilevel tree structure means dividing the animation cloth into a plurality of sub-areas level by level. FIG. 4 is a diagram illustrating the division of an animation cloth having $2^3 \times 2^3$ grid units based on a 3-level tree structure. Referring to FIG. 4, FIG. 4(a) illustrates an animation cloth having $2^3 \times 2^3$ grid units 420, wherein the animation cloth includes a first level sub-area 402, FIG. 4(b) illustrates that the first level sub-area 402 is divided into four second level sub-areas 404-1, 404-2, 404-3, and 404-4, and FIG. 4(c) illustrates that the second level sub-areas 404-1, 404-2, 404-3, and 404-4 are respectively divided into four third level sub-areas 406-1~406-4, 408-1~408-4, 410-1~410-3, and 412-1~412-4. Accordingly, a 3-level tree structure is formed by the first level sub-area, second level sub-areas, and third level sub-areas (as shown in FIG. 4(d)).

The curvature calculation module 104 is coupled to the multilevel area generation module 102. The curvature calculation module 104 calculates the curvatures of the level sub-areas according to the plane vectors of all the grid units in the level sub-areas in a frame. For example, the curvature of the second level sub-area 404-1 is calculated according to the plane vectors of all the grid units 420 in the second level sub-area 404-1. Here the plane vector refers to the normal vector of the animation cloth in a grid unit in a frame, and the curvature refers to the difference of the normal vectors between all the grid units in a level sub-area. In other words, the curvature of a level sub-area of the animation cloth refers to the curving degree of the animation cloth in the level sub-area. In the present embodiment, the curvature (i.e. the curving degree) is defined with a difference of the normal vectors. However, the present invention is not limited thereto, and the curvature of an animation cloth may also be defined in another appropriate way in another embodiment of the present invention.

The curvature comparison module 106 is coupled to the curvature calculation module 104. The curvature comparison module 106 compares the curvatures of the level sub-areas with a flatness threshold. In the present embodiment, the flatness threshold is a threshold value preset by a user.

The dynamic simulation module 108 is coupled to the curvature comparison module 106. The dynamic simulation module 108 simulates the animation cloth through different method according to the comparison result of the curvature comparison module 106. For example, the dynamic simulation module 108 simulates the plane vector of each grid unit in the animation cloth in a next frame through an interpolation method and a physical simulation method. When the curvature comparison module 106 determines that the level sub-areas are flat according to the flatness threshold, the dynamic simulation module 108 calculates the plane vector of each grid unit on the boundaries of the level sub-areas in a next frame through the physical simulation method and calculates the plane vector of each grid unit within the boundaries of the level sub-areas in the next frame through the interpolation method, and the curvature comparison module 106 stops comparing the curvatures of lower level sub-areas of these level sub-areas in the multilevel tree structure. When the curvature comparison module 106 determines that the level sub-areas are not flat and the level sub-areas are on the lowest level of the multilevel tree structure, the dynamic simulation module 108 simulates the plane vectors of all the grid units in the level sub-areas in the next frame through the physical simulation method.

Figure 5:
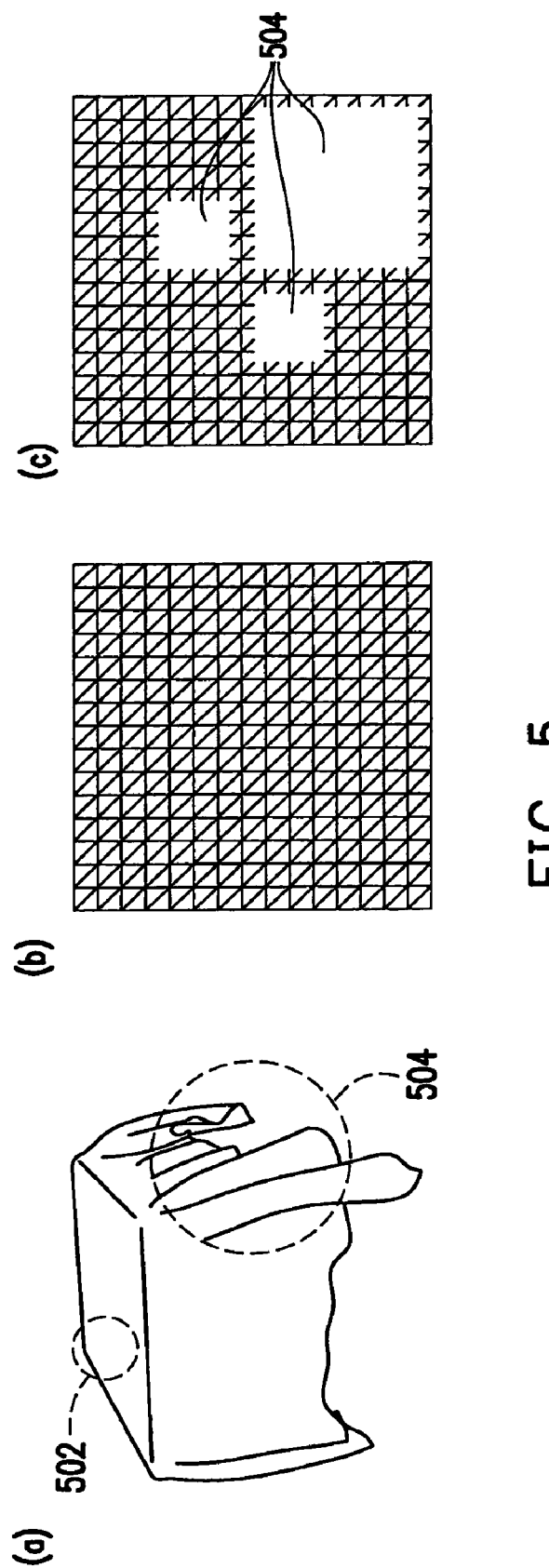
FIG. 5 is a diagram illustrating an example of the simulation of an animation cloth in a multilevel animation cloth simulation system.

FIG. 5 is a diagram illustrating an example of the simulation of an animation cloth in the multilevel animation cloth simulation system 100.

FIG. 5(*a*) illustrates an animation cloth to be simulated, wherein the top left corner 502 of the animation cloth is flat while the bottom right corner 504 thereof is curvy. FIG. 5(*b*) illustrates the animation cloth rendered by the multilevel area generation module 102 in a grid model having an array structure. In FIG. 5(*c*), the curvature calculation module 104 and the curvature comparison module 106 distinguish the flat and curvy portions of the animation cloth. Finally, the dynamic simulation module 108 simulates the curvy portion 504 of the animation cloth through a complicated physical simulation method according to the comparison result as in FIG. 5(*c*) and simulates the other portion of the animation cloth through a interpolation method which requires less calculations.

In another embodiment of the present invention, the multilevel animation cloth simulation system 100 further includes a graphic module (not shown) coupled to the dynamic simulation module 108, wherein the graphic module renders (or outputs) a next frame of the animation cloth according to the plane vectors of all the grid units of the animation cloth in the next frame.

Figure 6:
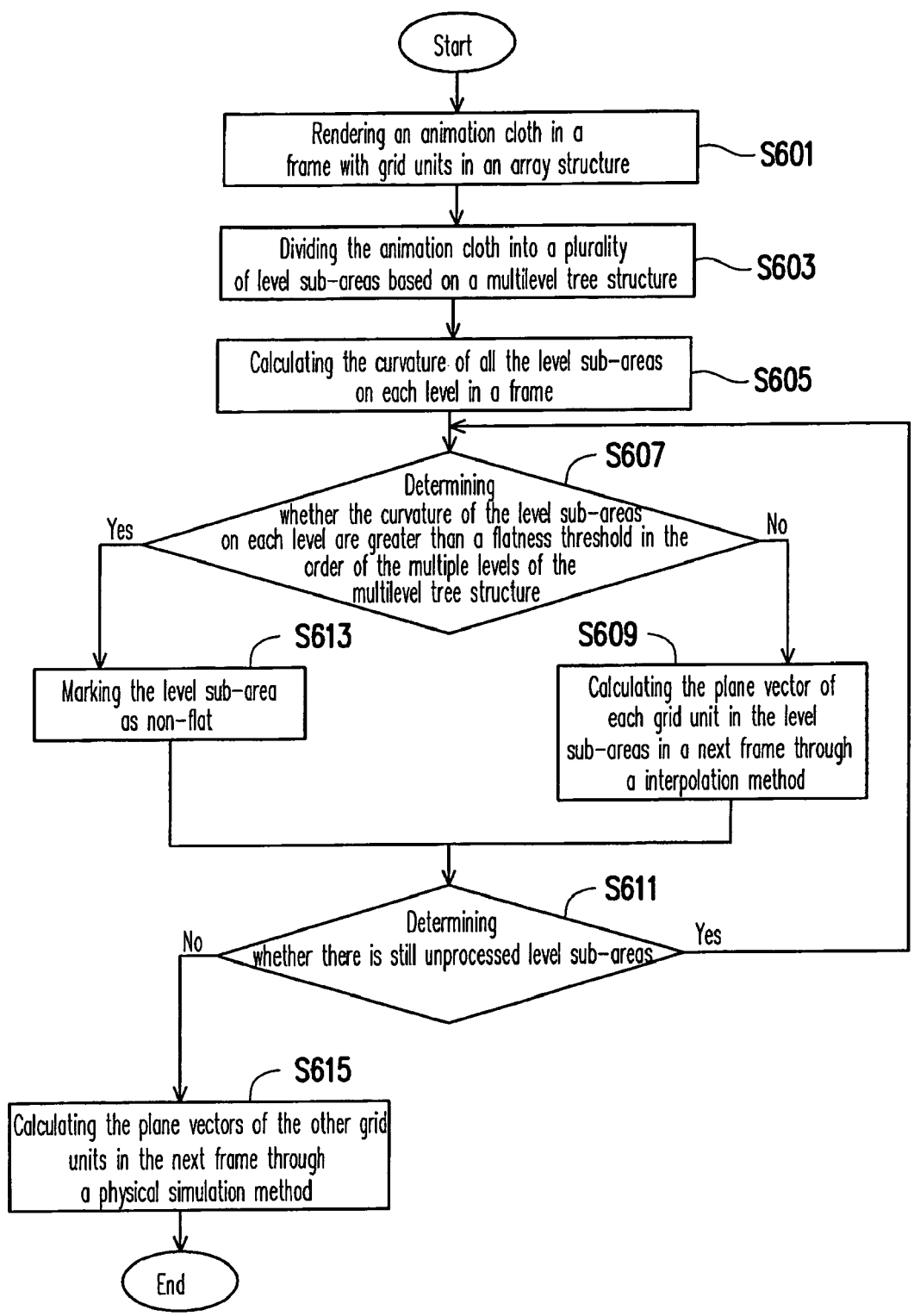
FIG. 6 is a flowchart illustrating a method for multilevel simulation of an animation cloth according to an embodiment of the present invention.

FIG. 6 is a flowchart illustrating a method for multilevel simulation of an animation cloth according to an embodiment of the present invention.

Referring to FIG. 6, in step S601, an animation cloth in a frame is rendered with grid units having an array structure. For example, the animation cloth is rendered with $2^N \times 2^N$ grid units having an array structure, wherein N is a positive integer.

Next, in step S603, the animation cloth is divided into a plurality of level sub-areas based on a multilevel tree structure, wherein the lower level sub-areas are generated by dividing each of the upper level sub-areas, such as an animation cloth rendered with $2^3 \times 2^3$ grid units and the corresponding 3-level tree structure thereof shown in FIG. 4.

In step S605, the curvatures of all the level sub-areas in a frame are calculated. To be specific, in step S605, the curvature of each level sub-area on each level is calculated according to the plane vectors of the grid units in the level sub-area in a frame. For example, in the present embodiment, the curvature of each level sub-area is calculated through a wavelet transform, such as a Harr wavelet transform.

Harr wavelet transform is a simple wavelet transform. According to Harr wavelet transform, the pixel values of an image are considered independent values and these values are added or subtracted to obtain the wavelet coefficients in the frequency domain. The added value gets bigger and bigger, namely, which contains the desired low frequency portion. Contrarily, the subtracted value represents the difference between the pixel values, and the difference is larger at the boundary of the image while smaller at the smooth portions of the image. Accordingly, the high-frequency portion is emphasized after the image is performed with the wavelet transform. In the present embodiment, this high-frequency portion is used for determining the curvature of an animation cloth.

FIG. 7 is a diagram illustrating an example of a Harr wavelet transform. Generally speaking, a Harr wavelet transform is divided into a horizontal division step and a vertical division step. FIG. 7(*a*) illustrates an animation cloth rendered with $2^2 \times 2^2$ grid units. During a Harr wavelet transform, first, a first level horizontal division is performed. Four pixels $A_1, A_2, B_1$, and $B_2$ are selected to perform the calculations of $A_1+A_2$, $A_1-A_2$, $B_1+B_2$, and $B_1-B_2$, and the calculation results are respectively stored back to the positions as shown in FIG. 7(*b*). The pixel values in the other columns are processed in the same way. Next, a first level vertical division is performed. Four pixels $A_{1+2}$, $A_{3+4}$, $C_{1+2}$, and $C_{3+4}$ are selected to perform the calculations of $A_{1+2}+A_{3+4}$, $A_{1+2}-A_{3+4}$, $C_{1+2}+C_{3+4}$, and $C_{1+2}+C_{3+4}$. Similar to the horizontal division, the other pixel values are processed in the same way and the calculation results are respectively stored back into the positions as shown in FIG. 7(*c*). By now the first level wavelet transform is completed, wherein the four grid units at the top left corner are the longitudinal and transverse low-frequency portion (i.e. the reduction of the original image), the four grid units at the bottom right corner are the longitudinal and transverse high-frequency portion (i.e. the difference between the pixel values of the original image), the four grid units at the bottom left corner are the transverse low-frequency and longitudinal high-frequency portion, and the four grid units at the top right corner are the transverse high-frequency and longitudinal low-frequency portion. All the high- and low-frequency information of the animation cloth rendered with $2^N \times 2^N$ grid units can be obtained after N-level Harr wavelet transforms are performed to the animation cloth.

Figure 8:
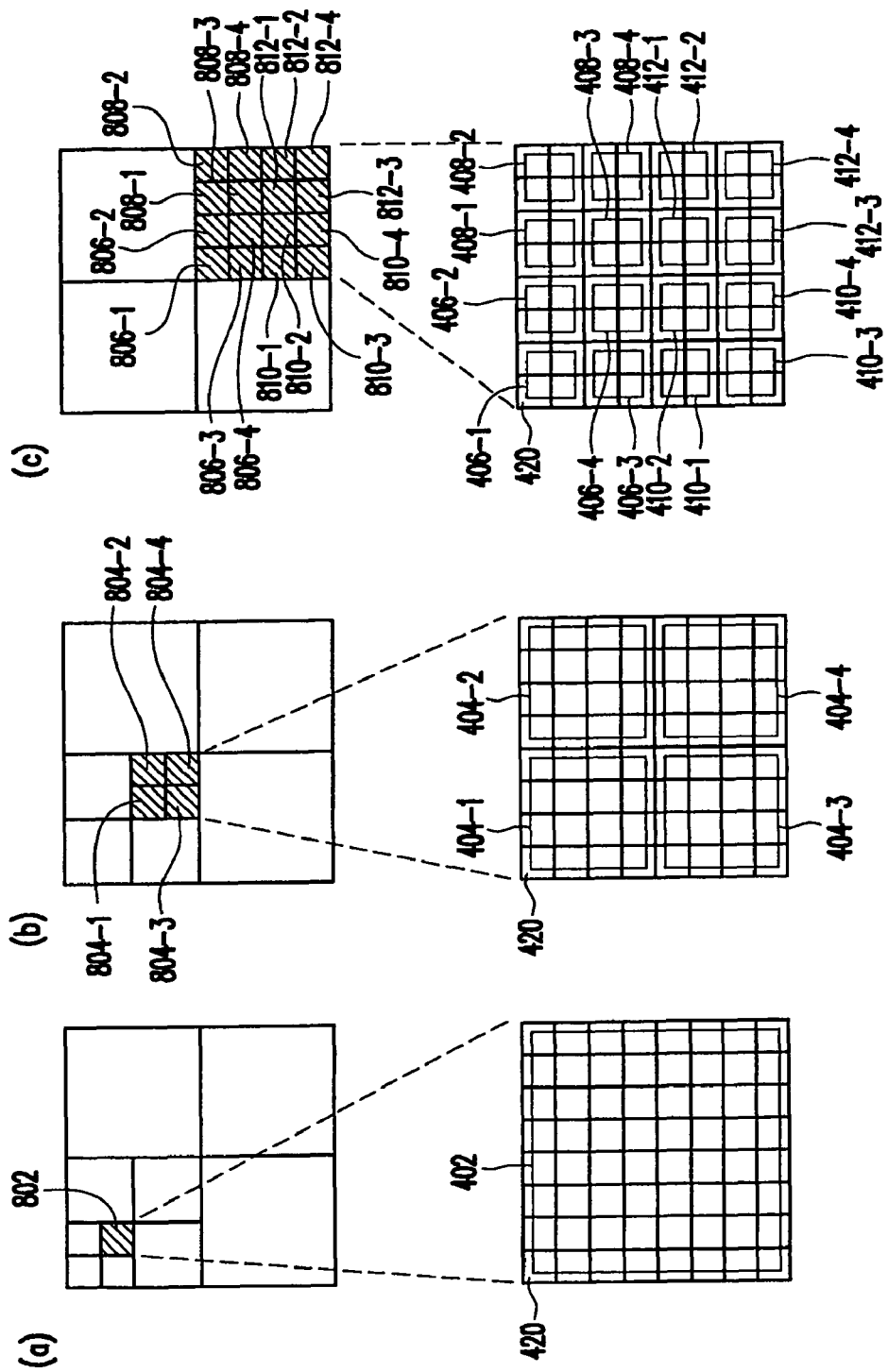
FIG. 8 is a diagram illustrating the curvatures obtained by performing a Harr wavelet transform to the animation cloth in FIG. 4 and the corresponding 3-level tree structure.

To describe the operation in the present embodiment clearly, how the curvature of each level sub-area during a Harr wavelet transform is corresponding to the 3-level tree structure will be described below with reference to the animation cloth rendered with $2^3 \times 2^3$ grid units as shown in FIG. 4. FIG. 8 is a diagram illustrating the curvatures obtained by performing a Harr wavelet transform to the animation cloth in FIG. 4 and the corresponding 3-level tree structure.

Referring to FIG. 4 and FIG. 8, a $2^3 \times 2^3$ array of wavelet coefficients is obtained after a Harr wavelet transform is performed to the plane vectors of the $2^3 \times 2^3$ grid units, and the wavelet coefficients are the standard for determining the curvature of the animation cloth in the present embodiment. The wavelet coefficient 802 in FIG. 8(*a*) represents the curvature of the first level sub-area 402, the wavelet coefficients 804-1~804-4 in FIG. 8(*b*) respectively represent the curvatures of the second level sub-areas 404-1~404-4, and the wavelet coefficients 806-1~806-4, 808-1~808-4, 810-1~810-3, and 812-1~812-4 in FIG. 8(*c*) respectively represent the curvatures of the third level sub-areas 406-1~406-4, 408-1~408-4, 410-1~410-3, and 412-1~412-4. Accordingly, the curvatures of all the level sub-areas can be calculated through a Harr wavelet transform.

Referring to FIG. 6 again, in step S607, whether the curvatures of the level sub-areas in each level are greater than a flatness threshold preset by the user is determined in the order of the multiple levels of the multilevel tree structure. After that, the plane vectors of the grid units in a next frame are calculated (simulated) by using different methods according to foregoing comparison result.

In the present embodiment, when the curvature of a level sub-area is smaller than or equal to the flatness threshold, all the lower level sub-areas of the level sub-area are marked as flat sub-areas, the plane vector of each grid unit on the boundary of the level sub-area in a next frame is calculated (simulated) through the physical simulation method and the plane vector of each grid unit within the boundary of the level sub-area in the next frame is calculated through the interpolation method (step S609). In other words, when an upper level sub-area in the multilevel tree structure is determined to be flat, then all the lower level sub-areas of the upper level sub-area are flat. In this case, the plane vector of each grid unit in the level sub-area in the next frame is directly calculated through the interpolation method, and it is not necessary to compare the curvatures of the lower level sub-areas anymore. For example, if the sub-area 404-1 in FIG. 4 is determined to be flat (i.e. the curvature thereof is smaller than or equal to the flatness threshold), the sub-areas 406-1~406-4 are all marked as flat and the plane vectors of the grid units in these sub-areas in the next frame are directly calculated through the interpolation method. After that, in step S611, whether there is still level sub-area to be processed is determined. The process returns to step S607 if it is determined that there is still level sub-area to be processed in step S611.

If it is determined that the curvature of the sub-area is greater than the flatness threshold in step S607, then the level sub-area is marked as a non-flat sub-area in step S613 and step S611 is executed. To be specific, since the current level sub-area is determined to be non-flat, if the level sub-area further includes lower level sub-areas, the flatness of the lower level sub-areas of the level sub-area is further determined. Namely, it is determined that there is still unprocessed level sub-area in step S611. Contrarily, the process is stopped if the sub-area is on the lowest level of the multilevel tree structure (i.e. the smallest sub-area).

If in step S611, it is determined that all the level sub-areas in the multilevel tree structure have been processed, then in step S615, the plane vectors of the other uncalculated grid units in the next frame are calculated through the physical simulation method. To be specific, in step S615, those non-flat level sub-areas on the lowest level of the multilevel tree structure are detected, and the plane vectors of grid units in these non-flat level sub-areas are calculated through the physical simulation method.

In the present embodiment, linear interpolation method is adopted as the interpolation method. However, the present invention is not limited thereto, and the interpolation method may also be nearest neighbor interpolation method, Spline interpolation method, or other suitable interpolation methods in another embodiment of the present invention.

In another embodiment of the present invention, the multilevel animation cloth simulation method further includes rendering the next frame of the animation cloth according to the plane vectors of the grid units in the next frame.

Foregoing multilevel animation cloth simulation method can be implemented by a computer program recorded in a computer-readable recording medium. The computer-readable recording medium can be any data storage device which can be read by a computer system. Examples of the computer-readable recording medium include read-only memory (ROM), random-access memory (RAM), CD-ROM, magnetic tape, floppy disk, optical data storage device, and carrier wave (for example, data transmission through the Internet) etc.

In overview, according to the present invention, an animation cloth is divided into a plurality of sub-areas based on a multilevel tree structure, and the curvatures of these sub-areas are determined in the order of the multiple levels so as to simulate these sub-areas of the animation cloth through different methods. Accordingly, the calculation time required for simulating the animation cloth is reduced without sacrificing the resolution of the animation cloth. Moreover, the calculation speed can be increased by calculating the curvatures of the sub-areas in a multilevel tree structure through a Harr wavelet transform. Furthermore, since only those portions of the animation cloth having large curvatures are simulated through the physical simulation method, the complexity of physical calculation is reduced and the stability thereof is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for multilevel simulation of an animation cloth, comprising: a computer for executing the following modules:
   a multilevel area generation module, dividing a plurality of grid units of the animation cloth into a plurality of level sub-areas based on a multilevel technique, wherein each of the level sub-areas is generated by dividing an upper level sub-area;
   a curvature calculation module, coupled to the multilevel area generation module, the curvature calculation module calculating a curvature of each of the level sub-areas in a first frame according to a plurality of first plane vectors of the grid units;
   a curvature comparison module, coupled to the curvature calculation module, the curvature comparison module comparing the curvatures of the level sub-areas with a flatness threshold; and
   a dynamic simulation module, coupled to the curvature comparison module, the dynamic simulation module calculating a second plane vector of each of the grid units in a second frame through different methods according to the comparison result of the curvature comparison module,
   wherein when the curvature comparison module determines that the curvatures of the level sub-areas are smaller than or equal to the flatness threshold, the dynamic simulation module calculates the second plane vector of each of the grid units on the boundaries of the level sub-areas through a physical simulation method and calculates the second plane vector of each of the grid units within the boundaries of the level sub-areas through an interpolation method, and the curvature comparison module stops comparing the curvatures of lower level sub-areas in the level sub-areas, and
   when the curvature comparison module determines that the curvatures of the level sub-areas are greater than the flatness threshold and the level sub-areas are on the lowest level, the dynamic simulation module calculates the second plane vector of each of the grid units in the level sub-areas through the physical simulation method.

2. The system according to claim 1, wherein the grid units have a $2^N \times 2^N$ array structure, wherein N is a positive integer.

3. The system according to claim 2, wherein the curvatures of the level sub-areas are calculated through a wavelet transform.

4. The system according to claim 3, wherein the wavelet transform is a Harr wavelet transform.

5. The system according to claim 1, wherein the first and second plane vectors of the grid units are normal vectors of the animation cloth in the grid units, and the curvature of each of the level sub-areas is a difference of the normal vectors between the grid units in the level sub-area.

6. The system according to claim 1 further comprising a graphic module coupled to the dynamic simulation module, wherein the graphic module renders the second frame according to the second plane vectors of the grid units.

7. The system according to claim 1, wherein the interpolation method is nearest neighbor interpolation method, linear interpolation method, or Spline interpolation method.

8. A method for multilevel simulation of an animation cloth, comprising:

dividing a plurality of grid units of the animation cloth into a plurality of level sub-areas based on a multilevel technique, wherein each of the level sub-areas is generated by dividing an upper level sub-area;

calculating a curvature of each of the level sub-areas according to a plurality of first plane vectors of the grid units in a first frame; and comparing the curvatures of the level sub-areas with a flatness threshold in the order of the multiple levels, wherein when the curvatures of the level sub-areas are smaller than or equal to the flatness threshold, a second plane vector of each of the grid units on the boundaries of the level sub-areas in a second frame is calculated through a physical simulation method and the second plane vector of each of the grid units within the boundaries of the level sub-areas in the second frame is calculated through an interpolation method, and the comparison of the curvatures of lower level sub-areas in the level sub-areas is stopped, when the curvatures of the level sub-areas are greater than the flatness threshold and the level sub-areas are on the lowest level, the second plane vector of each of the grid units in the level sub-areas in the second frame is calculated through the physical simulation method.

9. The method according to claim 8, wherein the grid units have a $2^N \times 2^N$ array structure, wherein N is a positive integer.

10. The method according to claim 9, wherein the curvatures of the level sub-areas are calculated through a wavelet transform.

11. The method according to claim 10, wherein the wavelet transform is a Harr wavelet transform.

12. The method according to claim 8, wherein the first and second plane vectors of the grid units are normal vectors of the animation cloth in the grid units, and the curvature of each of the level sub-areas is a difference of the normal vectors between the grid units in the level sub-area.

13. The method according to claim 8 further comprising rendering the second frame according to the second plane vectors of the grid units.

14. The method according to claim 8, wherein the interpolation method is nearest neighbor interpolation method, linear interpolation method, or Spline interpolation method.

15. A non-transitory computer-readable recording medium, for storing a computer program which executes a method for multilevel simulation of an animation cloth, the method comprising:

dividing a plurality of grid units of the animation cloth into a plurality of level sub-areas based on a multilevel technique, wherein each of the level sub-area is generated by dividing an upper level sub-area;

calculating a curvature of each of the level sub-areas according to a plurality of first plane vectors of the grid units in a first frame; and comparing the curvatures of the level sub-areas with a flatness threshold in the order of the multiple levels, wherein when the curvatures of the level sub-areas are smaller than or equal to the flatness threshold, a second plane vector of each of the grid units on the boundaries of the level sub-areas in a second frame is calculated through a physical simulation method and the second plane vector of each of the grid units within the boundaries of the level sub-areas in the second frame is calculated through an interpolation method, and the comparison of the curvatures of lower level sub-areas in the level sub-areas is stopped, when the curvatures of the level sub-areas are greater than the flatness threshold and the level sub-areas are on the lowest level, the second plane vector of each of the grid units in the level sub-areas in the second frame is calculated through the physical simulation method.

16. The non-transitory computer-readable recording medium according to claim 15, wherein the grid units have a $2^N \times 2^N$ array structure, wherein N is a positive integer.

17. The non-transitory computer-readable recording medium according to claim 16, wherein the curvatures of the level sub-areas are calculated through a wavelet transform.

18. The non-transitory computer-readable recording medium according to claim 17, wherein the wavelet transform is a Harr wavelet transform.

19. The non-transitory computer-readable recording medium according to claim 15, wherein the first and second plane vectors of the grid units are normal vectors of the animation cloth in the grid units, and the curvature of each of the level sub-areas is a difference of the normal vectors between the grid units in the level sub-area.

20. The non-transitory computer-readable recording medium according to claim 15 further comprising rendering the second frame according to the second plane vectors of the grid units.

21. The non-transitory computer-readable recording medium according to claim 15, wherein the interpolation method is nearest neighbor interpolation method, linear interpolation method, or Spline interpolation method.

* * * * *